US012663649B2

(12) United States Patent
Moisant-Thompson et al.

(10) Patent No.: US 12,663,649 B2
(45) Date of Patent: Jun. 23, 2026

(54) EYEWEAR WITH DISPLAY-OPTIMIZED LENSES

(71) Applicant: Apple Inc., Cupertino, CA (US)

(72) Inventors: Jonathan C Moisant-Thompson, San Jose, CA (US); Alexandre Chapiro, Sunnyvale, CA (US); Bennett S Wilburn, Saratoga, CA (US); Seth E Hunter, Santa Clara, CA (US); Ove Lyngnes, Carmel Valley, CA (US); Nicolas P Bonnier, Mountain View, CA (US); Cameron A Harder, San Francisco, CA (US); Nawaf Al-Baghly, San Jose, CA (US)

(73) Assignee: Apple Inc., Cupertino, CA (US)

( * ) Notice: Subject to any disclaimer, the term of this patent is extended or adjusted under 35 U.S.C. 154(b) by 21 days.

(21) Appl. No.: 18/453,879

(22) Filed: Aug. 22, 2023

(65) Prior Publication Data

US 2023/0393405 A1      Dec. 7, 2023

Related U.S. Application Data

(63) Continuation-in-part of application No. 17/223,495, filed on Apr. 6, 2021, now Pat. No. 11,803,060.
(Continued)

(51) Int. Cl.
G02B 27/01        (2006.01)
G02B 5/20        (2006.01)
(Continued)

(52) U.S. Cl.
CPC ......... G02B 27/0172 (2013.01); G02B 5/208 (2013.01); G02B 5/3083 (2013.01);
(Continued)

(58) Field of Classification Search
CPC ........ G02B 27/0172; G02B 2027/0178; G02B 2027/0187; G02B 27/0093;
(Continued)

(56) References Cited

U.S. PATENT DOCUMENTS 4,878,748 A      11/1989  Johansen et al.
7,393,100 B2      7/2008  Mertz
(Continued)

*Primary Examiner* — Jason M Mandeville
(74) *Attorney, Agent, or Firm* — Treyz Law Group, P.C.; Kendall P. Woodruff

(57)        ABSTRACT

Eyewear such as a head-mounted device may include display-optimized lenses. The lenses may be optimized for viewing an external display while also providing sun protection for the user's eyes. The external display may form part of a handheld electronic device that serves as a controller for the head-mounted device. The lenses in the head-mounted device may reduce ambient light brightness while maintaining the brightness of the external display so that the user can use the external display while wearing the head-mounted device. The user may, for example, provide touch input to the external display to adjust display content on the head-mounted display. The lenses may include a polarizer and a color filter having a transmission spectrum curve with peaks corresponding to the primary colors of the external display. The lenses may be removable clip-on lenses and the light filter may be an electrochromic filter.

16 Claims, 7 Drawing Sheets

Related U.S. Application Data

(60) Provisional application No. 63/016,813, filed on Apr. 28, 2020.

(51) Int. Cl.

| | |
|---|---|
| *G02B 5/30* | (2006.01) |
| *G02B 7/14* | (2021.01) |
| *G02B 27/00* | (2006.01) |
| *G02B 27/09* | (2006.01) |
| *G02F 1/157* | (2006.01) |

(52) U.S. Cl.
CPC ........... *G02B 7/14* (2013.01); *G02B 27/0093* (2013.01); *G02B 27/0955* (2013.01); *G02F 1/157* (2013.01); *G02B 2027/0118* (2013.01); *G02B 2027/0178* (2013.01); *G02B 2027/0187* (2013.01)

(58) Field of Classification Search
CPC ........ G02B 27/0955; G02B 2027/0118; G02B 5/208; G02B 5/3083; G02B 7/14; G02C 7/12; G02C 11/10; G02F 1/157
USPC ............................................................. 345/8
See application file for complete search history.

(56) References Cited

U.S. PATENT DOCUMENTS

| | | | |
|---|---|---|---|
| 8,044,879 B2 | 10/2011 | Matveev et al. | |
| 8,210,678 B1 | 7/2012 | Farwig | |
| 9,897,809 B2 | 2/2018 | Hue et al. | |
| 10,055,887 B1* | 8/2018 | Gil | G06F 1/163 |
| 11,803,060 B1* | 10/2023 | Wilburn | G02C 7/12 |
| 2004/0046927 A1 | 3/2004 | Montgomery | |
| 2006/0146275 A1* | 7/2006 | Mertz | G02C 7/12 351/44 |
| 2012/0326948 A1* | 12/2012 | Crocco | G09G 5/00 359/630 |
| 2014/0233105 A1 | 8/2014 | Schmeder et al. | |
| 2014/0375752 A1 | 12/2014 | Shoemake et al. | |
| 2015/0286057 A1 | 10/2015 | Walsh | |
| 2016/0109713 A1* | 4/2016 | Osterhout | G02B 27/0172 359/630 |
| 2016/0353098 A1* | 12/2016 | Stein | G02B 30/24 |
| 2017/0139234 A1 | 5/2017 | Sharp | |
| 2017/0345391 A1* | 11/2017 | Usui | G02B 27/0172 |
| 2018/0247676 A1* | 8/2018 | Raphael | H04N 21/43076 |
| 2021/0208396 A1* | 7/2021 | Li | G02B 5/1833 |

* cited by examiner

EYEWEAR WITH DISPLAY-OPTIMIZED LENSES

This application is a continuation-in-part of U.S. patent application Ser. No. 17/223,495, filed Apr. 6, 2021, which claims the benefit of U.S. provisional patent application No. 63/016,813, filed Apr. 28, 2020, both of which are hereby incorporated by reference herein in their entireties.

FIELD

This relates generally to wearable devices, and, more particularly, to wearable devices such as eyewear.

BACKGROUND

Sunglasses and other eyewear may include filters that reduce the brightness of light reaching the user's eyes.

Conventional sunglasses use filters that significantly reduce the brightness of display light, making it difficult for users to view displays while wearing conventional sunglasses.

SUMMARY

Eyewear such as a head-mounted device may include display-optimized lenses. The lenses may be optimized for viewing an external display while also providing sun protection for the user's eyes.

The external display may form part of a handheld electronic device that serves as a controller for the head-mounted device. The lenses in the head-mounted device may reduce ambient light brightness while maintaining the brightness of the external display so that the user can use the external display while wearing the head-mounted device. The user may, for example, provide touch input to the external display to adjust display content on the head-mounted display. The lenses may be removable clip-on lenses, if desired.

The display-optimized lenses may include a polarizer and a color filter that are designed for a given target display. Lenses that are optimized for a display that emits linearly polarized light may include a linear polarizer. Lenses that are optimized for a display that emits circularly polarized light may include a circular polarizer. The circular polarizer may include a quarter wave plate and a linear polarizer. The linear polarizer may be located between the quarter wave plate and the color filter. If desired, the light filter may be an electrochromic filter.

The color filter may have a transmission spectrum curve with peaks corresponding to the primary colors of the target display so that the color and brightness of display light is preserved while the brightness of sunlight is reduced. The filter may be provided with other transmission spectrum characteristics depending on the desired filter attributes. For example, the light filter transmission spectrum may be designed to minimize the ratio of sunlight brightness to display light brightness reaching the user's eyes, to minimize color shifts in traffic lights and other driver safety signs, to minimize color shifts in memory colors such as skin colors, sky colors, tree colors, etc., to minimize color shifts in fluorescent lights, and/or to achieve other filter effects.

DETAILED DESCRIPTION

Eyewear such as sunglasses may have display-optimized lenses that reduce the brightness of ambient light by a greater amount than the brightness of display light. The display-optimized lenses may each include a polarizer and a color filter. The polarization of the polarizer in the display-optimized lenses may match the polarization of light emitted from a target display, and the color filter may be customized based on the color spectrum of the target display. The display-optimized lenses may be optimized for an external display and/or may be optimized for a display that is part of the eyewear itself (e.g., a head-mounted display).

For example, the display-optimized lenses may be used in sunglasses, glasses, or other eyewear that includes displays such as head-mounted displays (sometimes referred to as near-eye displays). The display-optimized lenses may darken ambient light for the user to improve the viewability of the display content on the head-mounted displays. At the same time, the display-optimized lenses may be configured to transmit display light from a target display in an external electronic device (e.g., a cellular telephone display, a tablet computer display, a laptop computer display, and/or any other external display). This may be especially beneficial in scenarios where the display content on the head-mounted displays is provided by or controlled using the external electronic device. In these types of arrangements, the user may need to interact with the external electronic device while wearing the head-mounted display. For example, the user may use the display on the external electronic device to select or adjust the display content that the user is viewing on the head-mounted display. By using lenses in the head-mounted device that are optimized for viewing the external display while darkening ambient light, the user can view bright display content on both the head-mounted display and the external display without the interference of ambient light.

Figure 1:
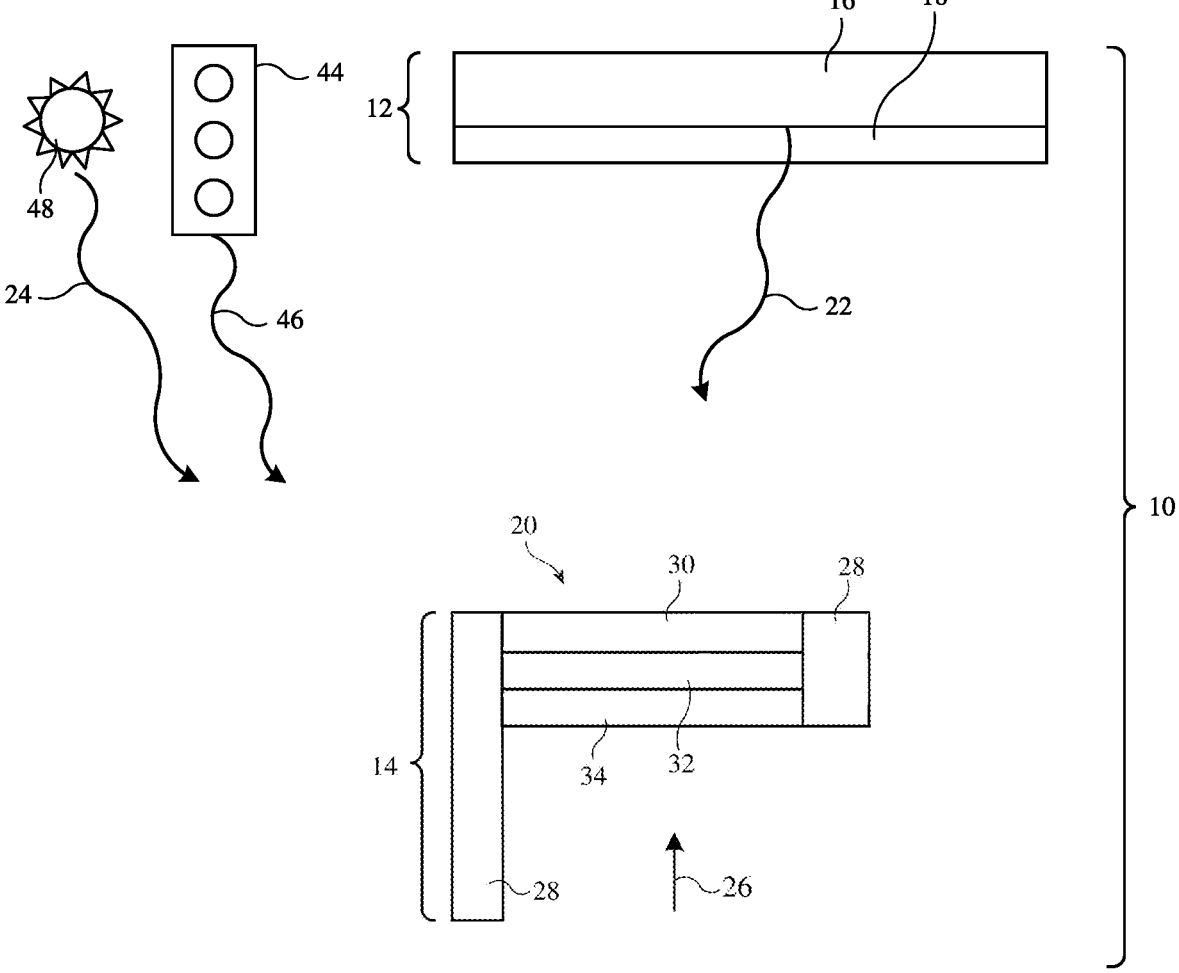
FIG. 1 is a diagram of illustrative system that includes eyewear with display-optimized lenses in accordance with an embodiment.

An illustrative system having eyewear with display-optimized lenses is shown in FIG. 1. System 10 may include head-mounted eyewear such as sunglasses 14 (sometimes referred to as glasses 14, head-mounted device 14, eyewear 14, etc.). Sunglasses 14 may include one or more optical systems such as lens components 20 mounted in a support structure such as support structure 28. Structure 28 may have the shape of a pair of eyeglasses (e.g., supporting frames), may have the shape of goggles, may form a housing having a helmet shape, or may have other configurations to help in mounting and securing the components of sunglasses 14 on the head of a user.

Lens components 20 may form lenses that allow a viewer (sometimes referred to herein as a user of sunglasses 14, a wearer of sunglasses 14, etc.) to view external objects through lenses 20 in direction 26. For example, a user wearing sunglasses 14 may view external objects in the environment such as electronic device 12, traffic lights 44, and other objects in the environment through lenses 20. Only a single lens 20 is shown in FIG. 1, but sunglasses 14 may include any suitable number of lenses 20. Sunglasses 14 may, for example, include a left lens 20 aligned with a viewer's left eye and a right lens 20 aligned with a viewer's right eye. Arrangements in which sunglasses 14 include left and right lenses 20 for respective left and right eyes are sometimes described herein as an example. Lenses 20 may be permanently or removably attached to glasses 14. For example, lenses 20 may be clip-on lenses, magnetically attached lenses, and/or other detachable lenses that can be selectively attached to and removed from glasses 14.

Sunglasses 14 may include light filters for reducing the intensity of light that reaches the viewer's eyes. For example, sunglasses 14 may be worn outside and may be used to reduce the brightness of sunlight 24 from sun 48.

Sunglasses 14 may be used purely for sun protection or sunglasses 14 may include displays that display virtual reality or augmented reality content (e.g., sunglasses 14 may be a head-mounted display). In this type of configuration, one or both of lens components 20 may be overlapped by a display such as display 30.

Display 30 may be an opaque display or a transparent display. In an opaque display, the real-world environment may be captured using one or more image sensors in device 14 and displayed on display 30. In arrangements where display 30 is transparent or translucent, display 30 may include a medium through which ambient light and display is directed to the user's eyes. The medium may be an optical waveguide, a hologram medium, an optical combiner, an optical reflector, or any combination thereof. Display 30 may utilize digital light projection, organic light-emitting diodes, light-emitting diodes, micro-light-emitting diodes (µLEDs), liquid crystal on silicon, laser scanning light sources, or any combination of these technologies. If desired, display 30 may be configured to become opaque selectively.

In arrangements where sunglasses 14 are part of a head-mounted device with electrical components such as displays 30, sunglasses 14 may also include control circuitry. Control circuitry in sunglasses 14 may include processing circuitry such as microprocessors, digital signal processors, micro-controllers, baseband processors, image processors, application-specific integrated circuits with processing circuitry, and/or other processing circuitry and may include random-access memory, read-only memory, flash storage, hard disk storage, and/or other storage (e.g., a non-transitory storage media for storing computer instructions for software that runs on the control circuitry).

Sunglasses 14 that form part of a head-mounted device with electrical components may also include input-output circuitry such as eye state sensors, range finders disposed to measure the distance to external objects, touch sensors, buttons, microphones to gather voice input and other input, sensors, and other devices that gather input (e.g., input from a user of sunglasses 14) and may include light-emitting diodes, displays, speakers, and other devices for providing output. Sunglasses 14 may, if desired, include wireless circuitry and/or other circuitry to support communications with a computer or other external equipment.

This is merely illustrative, however. If desired, sunglasses 14 may not include displays 30 and/or may be completely free of electrical components. Arrangements in which glasses 14 are sunglasses that do not include displays are sometimes described herein as an illustrative example.

A user may wear sunglasses 14 to protect his or her eyes from sunlight 24 and/or to view display content on display 30. While wearing sunglasses 14 for sun protection and/or for viewing display content on display 30, the user may wish to use an electronic device such as electronic device 12. Electronic device 12 may be a computing device such as a laptop computer, a computer monitor containing an embedded computer, a tablet computer, a cellular telephone, a media player, or other handheld or portable electronic device, a smaller device such as a wrist-watch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment. In the illustrative configuration of FIG. 1, device 12 is a portable device such as a cellular telephone, media player, tablet computer, laptop computer, wrist device, or other portable computing device. Other configurations may be used for device 12 if desired. The example of FIG. 1 is merely illustrative.

In the example of FIG. 1, device 12 includes a display such as display 16 mounted in a housing. The housing of device 12 be formed of plastic, glass, ceramics, fiber composites, metal (e.g., stainless steel, aluminum, etc.), other suitable materials, or a combination of any two or more of these materials. The housing may be formed using a unibody configuration in which some or all of the housing is machined or molded as a single structure or may be formed using multiple structures (e.g., an internal frame structure, one or more structures that form exterior housing surfaces, etc.).

Display 16 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch screen electrodes may be formed from an array of indium tin oxide pads or other transparent conductive structures.

Display 16 may include an array of display pixels formed from organic light-emitting diodes (e.g., a thin-film organic light-emitting diode display), liquid crystal display (LCD) components, an array of electrophoretic display pixels, an array of plasma display pixels, microelectromechanical (MEMs) shutter pixels, electrowetting pixels, micro-light-emitting diodes (small crystalline semiconductor die), quantum dot light-emitting diodes, or display pixels based on other display technologies. The array of display pixels may display images for a user in active area of display 16. In some arrangements, the active area may be surrounded on one or more sides by an inactive border region. In other arrangements, display 16 may be borderless or nearly borderless (e.g., where inactive border regions have been eliminated or minimized).

Display 16 may be protected using a display cover layer such as a layer of transparent glass, polymer, or crystalline material such as sapphire. Openings may be formed in the display cover layer. For example, an opening may be formed in the display cover layer to accommodate a button, a speaker port, or other component. Openings may be formed in the housing of device 12 to form communications ports (e.g., an audio jack port, a digital data port, etc.), to form openings for buttons, etc.

Electronic device 12 may have control circuitry. The control circuitry may include storage and processing circuitry for supporting the operation of device 12. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in the control circuitry may be used to control the operation of device 12. The processing circuitry may be based on one or more microprocessors, microcontrollers, digital signal processors, baseband processors, power management units, audio chips, application specific integrated circuits, etc.

Input-output circuitry in electronic device 12 may be used to allow data to be supplied to device 12 and to allow data to be provided from device 12 to external devices. Input-output devices in device 12 may include buttons, joysticks, scrolling wheels, touch pads, keypads, keyboards, microphones, speakers, tone generators, vibrators, cameras, sensors, light-emitting diodes and other status indicators, data ports, etc. A user can control the operation of device 12 by supplying commands through the input-output devices and may receive status information and other output from device 12 using the output resources of input-output devices. Input-output devices of device 12 may include one or more displays such as display 16.

Control circuitry in device 12 may be used to run software on device 12 such as operating system code and applications. During operation of device 12, the software running on the control circuitry may display images on display 16 using an array of pixels in display 16. While displaying images, display 16 may emit display light 22. Display 16 may be covered with a polarizer such as polarizer 18. Polarizer 18 may be permanently attached to display 16 or may be part of a removable screen protector that can be selectively attached to and removed from display 16. Polarizer 18 may include one or more polarizer layers such as linear polarizer layers, one or more circular polarizer layers, one or more quarter wave plate layers, and/or one or more half wave plate layers. In some arrangements, polarizer 18 may include a linear polarizer and display light 22 may be linearly polarized light. In other arrangements, polarizer 18 may include a linear polarizer that is covered with a quarter wave plate. The quarter wave plate may convert the linearly polarized light received from the linear polarizer into circularly polarized display light 22. These examples are merely illustrative. Device 12 may have other polarizer arrangements, if desired.

To protect the user's eyes from sunlight 24 while also allowing the user to view electronic device displays such as display 16 and/or display 30, lenses 20 of sunglasses 14 may be display-optimized lenses that reduce the brightness of sunlight 24 by a greater amount than light from other light sources such as display light 22. Display-optimized lenses

20 may include one or more polarizers such as polarizer 32 and one or more light filters such as light filter 34 (sometimes referred to as a color filter). Polarizer 32 and light filter 34 may be optimized for display viewing. Because different types of displays have different color spectrums and different polarizer configurations, display-optimized lenses 20 may include polarizer layers and light filter layers that are tailored to a target display. As used herein, "target display" may refer to any display that can be viewed through lenses 20, such as display 16 of device 12 and/or display 30 in glasses 14.

In the example of FIG. 1, light filter 34 is interposed between the user's eye and polarizer 32. This is merely illustrative. If desired, polarizer 32 may be interposed between the user's eye and light filter 34, and light filter 34 may be interposed between display 30 and polarizer 32. Arrangements in which display 30 is interposed between the user's eye and lens 20 may also be used (e.g., so that display light 22 passes through polarizer 32 and color filter 34 before passing through display 30). For example, lenses 20 may be removably or permanently attached behind displays 30 in glasses 14.

In configurations where glasses 14 include displays 30, lenses 20 may be optimized for viewing of display 30 (e.g., by reducing the brightness of sunlight 24 while preserving the brightness and/or color of light from display 30 as much as possible or desired) and/or may be optimized for viewing of external display 16 of electronic device 12. Arrangements in which polarizer 32 and light filter 34 are optimized for viewing of display 16 are sometimes described herein as an example. However, it should be understood that polarizer 32 and light filter 34 may be optimized for any display, including displays 30 in glasses 14.

In some arrangements, device 12 may be used to adjust or control display content on display 30. For example, display 16 may be used to display a menu, on-screen selectable options, and/or other information related to sunglasses 14, display 30, and/or the display content that is being viewed on display 30. In some scenarios, device 12 may be the source of display content that is displayed on display 30. Power and/or graphics processing for display 30 of glasses 14 may also be provided by device 12, if desired (e.g., through a wired or wireless connection). For example, display 30 may serve as a secondary and/or extended display for display 16 (e.g., in which display content on display 30 mirrors display content on display 16, in which display content on display 30 is streamed from or otherwise provided by device 12, and/or in which user input to device 12 is used to control display content on display 30). User input to device 12 (e.g., touch input to display 16, voice input to a microphone in device 12, and/or other input to device 12) may be used to adjust the display content on display 30 and/or to adjust other settings or operations of glasses 14. If the display content on display 16 is too dark due to the presence of inappropriately tinted lenses, the user would find it difficult to use device 12 while wearing glasses 14. By using lenses 20 that are optimized for viewing display 16 (e.g., lenses that transmit most or all of display light 22 while reducing the brightness of ambient light 24), the user can view bright display content on display 16 and display 30 without the interference of ambient light. This allows the user to use device 12 as a controller (e.g., a gaming controller, a remote control, etc.) for display 30 while wearing glasses 14.

Polarizer 32 and light filter 34 may have properties that are selected based on the characteristics of a given target display. In particular, the polarization properties of polarizer 32 may be selected based on the polarization of display light 22, and the transmission spectrum of light filter 34 may be based on the color spectrum of display light 22. For example, if polarizer 18 of device 12 is a circular polarizer and display light 22 is circularly polarized, polarizer 32 may be a circular polarizer. If polarizer 18 of device 12 is a linear polarizer and display light 22 is linearly polarized, polarizer 32 may be a linear polarizer. Polarizer 32 may be configured to transmit more display light 22 than sunlight 24. For example, polarizer 32 may transmit 90% (or other suitable amount) of display light 22 while blocking 50% (or other suitable amount) of light from the environment (e.g., sunlight 24). This is merely illustrative. Polarizer 32 may transmit other amounts of display light 22 and sunlight 24.

Polarizer 32 may also be optimized based on the optics of display 30. For example, display 30 may include polarizers, quarter wave plates, half wave plates, and/or other optics that allow the user to view display content on displays 30 while also viewing the real-world environment through displays 30. Properties of polarizer 32 may be selected based on the optics of display 30 to maintain the brightness of display content on both display 16 and display 30 while reducing ambient light brightness. If, for example, display 30 includes a quarter wave plate, polarizer 32 may include a half wave plate to accommodate the display light that passes back and forth through the quarter wave plate.

Light filter 34 may also be configured to transmit more display light 22 than sunlight 24. In particular, light filter 34 may have a transmission spectrum that reduces the brightness of sunlight 24 (e.g., by blocking certain wavelengths of light that are present in sunlight 24 but not present in display light 22) without reducing (or without significantly reducing) the brightness of display light 22 (e.g., by transmitting certain wavelengths of light that are present in display light 22 and blocking certain wavelengths of light that are not present in display light 22). Light filter 34 may be a reflective filter (e.g., a dichroic filter) that reflects light that is not transmitted through filter 34 or may be an absorptive filter that absorbs light that is not transmitted through filter 34.

If desired, light filter 34 may be specifically designed based on a target display. For example, light filter 34 may be produced by first obtaining the color spectrum of a given target display (e.g., display 16 and/or display 30) and then determining the desired transmission spectrum of light filter 34 based on the color spectrum of the target display (e.g., so that the transmission spectrum curve of color filter 34 has passbands and/or peaks that correspond to the primary colors of light emitted by display 16 and/or display 30).

If desired, light filter 34 may be a tunable (e.g., switchable) electrochromic filter. The electrochromic filter may be switchable between a clear state (e.g., transmitting most or all of ambient light 24 and display light 22) and a tinted state (e.g., transmitting most or all of display light 22 while darkening ambient light 24). Control circuitry in glasses 14 and/or device 12 may be used to control and adjust the state of filter 34 (e.g., based on user input, sensor data, etc.).

In addition to optimizing light filter 34 for display viewing by using a transmission spectrum that reduces brightness of sunlight 24 more than display light 22, it may be desirable to ensure that the color and/or brightness of light from other light sources is preserved and/or minimally altered after passing through lenses 22. For example, light filter 34 may be designed so that the color and/or brightness of light 46 from traffic lights 44 (and/or other driver safety associated colors such as signs, placards, warning lights, etc.) is unchanged or only slightly changed after passing through lenses 20. Preserving traffic light color, traffic sign color, and/or other driver safety associated colors is an illustrative example of the types of characteristics that light filter 34 may exhibit. In general, light filter 34 may be designed to preserve any suitable color. For example, common colors (sometimes referred to as "memory" colors) such as skin colors, sky colors, tree colors, fluorescent light colors, and/or any other desired color may be unchanged or minimally changed after passing through filter 34 by providing filter 34 with the appropriate transmission characteristics.

Figure 2:
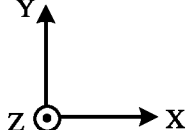
FIG. 2 is a cross-sectional side view of an illustrative system with eyewear for viewing a display that emits circularly polarized light in accordance with an embodiment.
Figure 2:
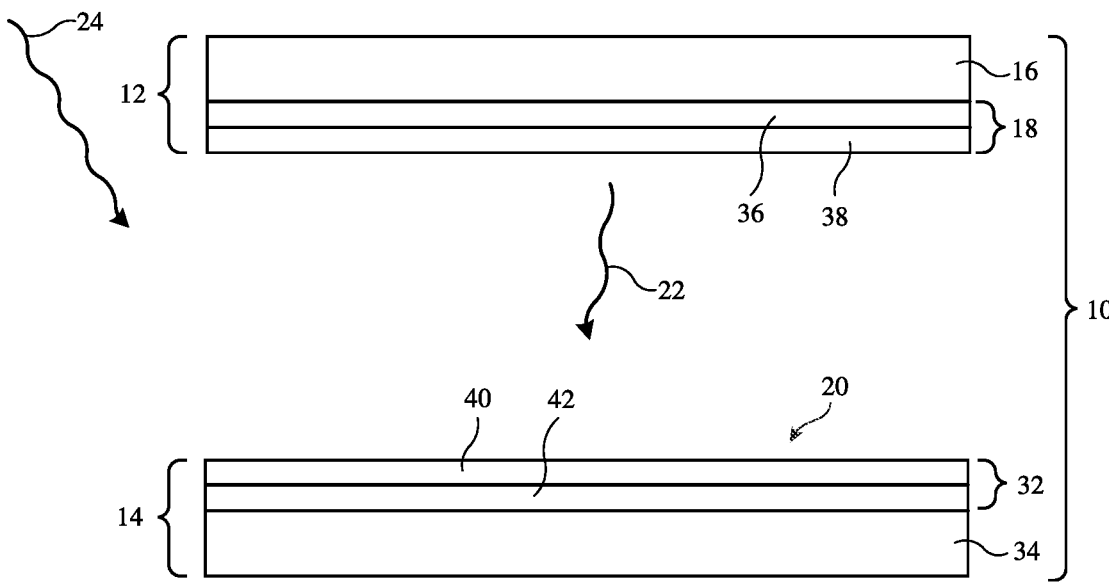

FIG. 2 is a cross-sectional side view of system 10 in which sunglasses 14 are optimized for a display that emits circularly polarized light. As shown in FIG. 2, display 16 of device 12 may be covered by polarizer 18. Polarizer 18 may be a polarizer that is integral with display 16 and/or that is incorporated into device 12 during manufacturing of device 12, or polarizer 18 may be an optional accessory that a user of device 12 may purchase separately and attach to display 16.

In the example of FIG. 2, polarizer 18 is a circular polarizer that converts light from display 16 to circularly polarized light. Polarizer 18 may include one or more polarizer layers such as inner polarizer layer 36 and outer polarizer layer 38. Inner polarizer layer 36 may be interposed between display 16 (e.g., the pixel array of display 16) and outer polarizer 38. Inner polarizer 36 may be a linear polarizer (e.g., having a vertical transmission axis that runs parallel to the Z-axis of FIG. 2 or other suitable transmission axis). Outer polarizer layer 38 may be a quarter wave plate that circularly polarizes the light received from polarizer 36 to produce circularly polarized display light 22.

To transmit circularly polarized display light 22, polarizer 32 of lenses 20 in sunglasses 14 may be a circular polarizer having an outer polarizer layer 40 and an inner polarizer layer 42. Outer polarizer layer 40 may be a quarter wave plate that converts the circularly polarized display light 22 to linearly polarized light. Inner polarizer layer 42 may be interposed between outer polarizer 40 and light filter 34. Inner polarizer layer 42 may be a linear polarizer (e.g., having a vertical transmission axis that runs parallel to the Z-axis of FIG. 2 or having other suitable transmission axis that aligns with the polarization of display light 22). After circularly polarized display light 22 is converted to linearly polarized display light by quarter wave plate 40, the linearly polarized display light may be aligned with the transmission axis of linear polarizer 42 and may pass through linear polarizer 42 towards light filter 34.

Light filter 34 may be a color filter having a transmission spectrum that is optimized for display viewing while also providing satisfactory sun protection. As discussed in connection with FIG. 1, the transmission spectrum of light filter 34 may be customized for the color spectrum of display light 22 so that the brightness and/or color of display light 22 are preserved while the brightness of sunlight 24 is significantly reduced. For example, the transmission spectrum curve of light filter 34 may have passbands and/or peaks that correspond to the primary colors emitted by display 16 (e.g., red, green, and blue), while other wavelengths of light that are present in sunlight 24 may be blocked (e.g., reflected from filter 34 and/or absorbed by filter 34).

If desired, filter 34 may be provided with additional transmission spectrum characteristics so that certain colors are preserved and/or minimally changed by filter 34. For example, filter 34 may be designed to preserve or minimally alter traffic light color, traffic sign color, and/or other driver safety associated colors, memory colors such as skin, sky, trees, etc., fluorescent light colors, and/or any other suitable color. This is, however, merely illustrative. If desired, filter 34 may only be optimized to reduce the brightness of sunlight 24 while preserving as much of the brightness and/or color of display light 22 as desired.

The combination of polarizer 32 and filter 34 may reduce the brightness of sunlight 24 by a first amount (e.g., between 90% and 85%, between 85% and 80%, between 95% and 85%, between 90% and 70%, less than 70%, more than 70%, or other suitable amount) and may reduce the brightness of display light 22 by a second amount (e.g., between 0% and 50%, between 40% and 50%, between 20% and 40%, between 10% and 50%, between 50% and 60%, between 60% and 70%, more than 50%, less than 50%, or other suitable amount) that is less than the first amount. The brightness ratio of sunlight 24 to display light 22 (e.g., as measured in the XYZ color space or other suitable color space) reaching the user's eyes through lenses 20 may be, for example, between 0.2 and 0.3, between 0.15 and 0.40, between 0.1 and 0.35, between 0.25 and 0.45, between 0.3 and 0.6, greater than 0.6, less than 0.6, or other suitable ratio.

The example of FIG. 2 in which polarizer 32 is stacked in front of light filter 34 is merely illustrative. If desired, light filter 34 may be stacked in front of polarizer 32 so that outside light first passes through light filter 34 and then passes through polarizer 32 before reaching the user's eye. With this type of configuration, quarter wave plate 40 may be interposed between linear polarizer layer 42 and light filter 34.

Figure 3:
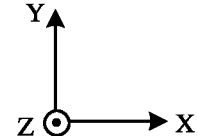
FIG. 3 is a cross-sectional side view of an illustrative system with eyewear for viewing a display that emits linearly polarized light in accordance with an embodiment.
Figure 3:
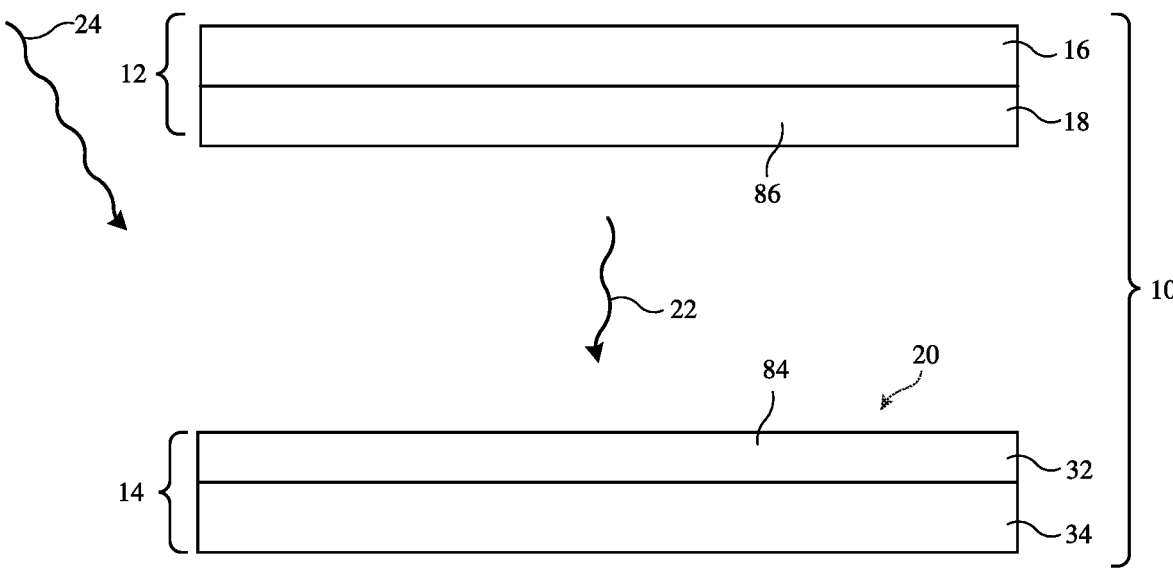

FIG. 3 is a cross-sectional side view of system 10 in which sunglasses 14 are optimized for a display that emits linearly polarized light. As shown in FIG. 3, display 16 of device 12 may be covered by polarizer 18.

In the example of FIG. 3, polarizer 18 is a linear polarizer that converts light from display 16 to linearly polarized light. Polarizer 18 may include one or more polarizer layers such as linear polarizer layer 86. Linear polarizer 86 may, for example, have a vertical transmission axis that runs parallel to the Z-axis of FIG. 3 or other suitable transmission spectrum.

To transmit linearly polarized display light 22, polarizer 32 of lenses 20 in sunglasses 14 may be a linear polarizer formed from linear polarizer layer 84. Linear polarizer layer 84 may have a transmission axis that is parallel to the transmission axis of linear polarizer 86 (e.g., linear polarizer layer 84 may have a vertical transmission axis that runs parallel to the Z-axis of FIG. 3 or other suitable transmission axis that aligns with polarized display light 22). The linearly polarized display light 22 may be aligned with the transmission axis of linear polarizer 84 and may pass through linear polarizer 84 towards light filter 34.

Light filter 34 may be a color filter having a transmission spectrum that is optimized for display viewing while also providing satisfactory sun protection. As discussed in connection with FIG. 1, the transmission spectrum of light filter 34 may be customized for the color spectrum of display light 22 so that the brightness and/or color of display light 22 are preserved while the brightness of sunlight 24 is significantly reduced. For example, the transmission spectrum of light filter 34 may have passbands that encompass the peak wavelengths of the primary colors emitted by display 16 (e.g., red, green, and blue), while other wavelengths of light that are present in sunlight 24 may be blocked (e.g., reflected from filter 34 and/or absorbed by filter 34).

If desired, filter 34 may be provided with additional transmission spectrum characteristics so that certain colors are preserved and/or minimally changed by filter 34. For example, filter 34 may be designed to preserve or minimally alter traffic light color, traffic sign color, and/or other driver safety associated colors, memory colors such as skin, sky, trees, etc., fluorescent light colors, and/or any other suitable color. This is, however, merely illustrative. If desired, filter 34 may only be optimized to reduce the brightness of sunlight 24 while preserving as much of the brightness and/or color of display light 22 as desired.

The combination of polarizer 32 and filter 34 may reduce the brightness of sunlight 24 by a first amount (e.g., between 90% and 85%, between 85% and 80%, between 95% and 85%, between 90% and 70%, less than 70%, more than 70%, or other suitable amount) and may reduce the brightness of display light 22 by a second amount (e.g., between 0% and 50%, between 40% and 50%, between 20% and 40%, between 10% and 50%, between 50% and 60%, between 60% and 70%, more than 50%, less than 50%, or other suitable amount) that is less than the first amount. The brightness ratio of sunlight 24 to display light 22 (e.g., as measured in the XYZ color space or other suitable color space) reaching the user's eyes through lenses 20 may be, for example, between 0.2 and 0.3, between 0.15 and 0.40, between 0.1 and 0.35, between 0.25 and 0.45, between 0.3 and 0.6, greater than 0.6, less than 0.6, or other suitable ratio.

The example of FIG. 3 in which polarizer 32 is stacked in front of light filter 34 is merely illustrative. If desired, light filter 34 may be stacked in front of polarizer 32 so that outside light first passes through light filter 34 and then passes through polarizer 32 before reaching the user's eye. With this type of configuration, linear polarizer layer 84 may receive outside light such as display light 22 and sunlight 24 through light filter 34.

Figure 4:
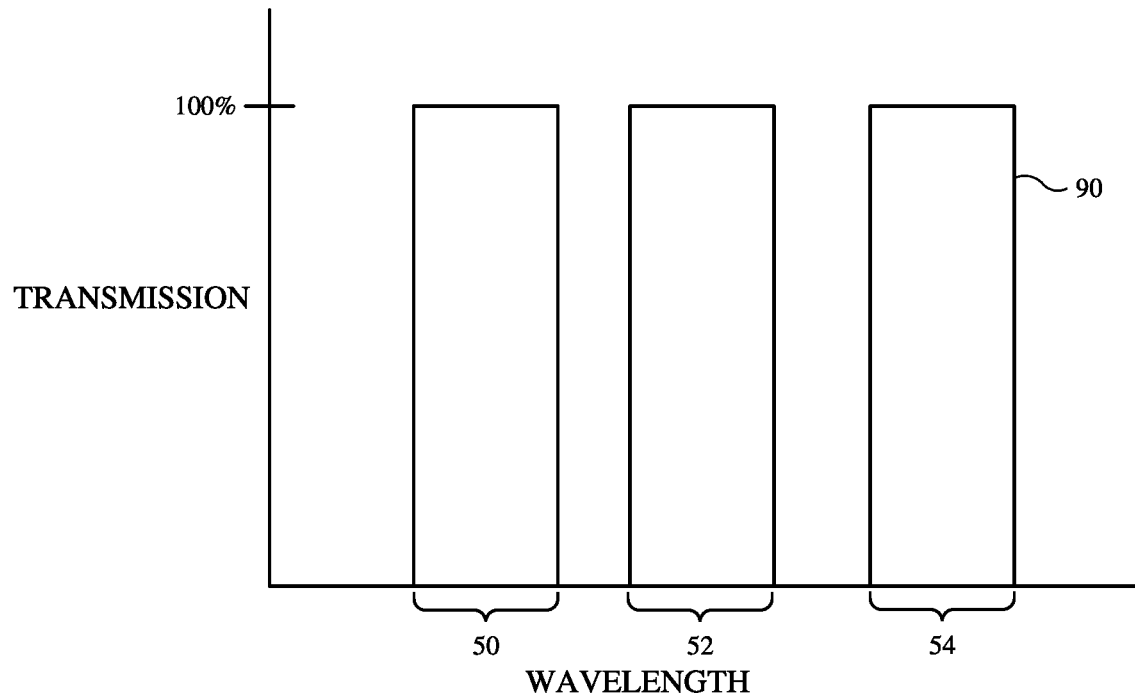
FIGS. 4, 5, and 6 are graphs showing illustrative transmission spectrums for a filter that may be used in display-optimized lenses in accordance with an embodiment.

FIG. 4 is a graph of an illustrative transmission spectrum that may be used in light filter 34. Curve 90 of FIG. 4 illustrates how much light of different wavelengths is transmitted through filter 34 when filter 34 has a discrete pass band configuration. In the example of FIG. 4, filter 34 has discrete pass bands such as pass bands 50, 52, and 54. The discrete pass bands may each encompass a given primary color of display 16. For example, pass band 50 may transmit a range of wavelengths corresponding to blue light, pass band 52 may transmit a range of wavelengths corresponding to green light, and pass band 54 may transmit a range of wavelengths corresponding to red light. Filter 34 may block all light outside of these discrete pass bands, if desired. Filter 34 of FIG. 4 may be configured to reduce the brightness of sunlight more than the brightness of display light.

In most displays, the display color spectrum does not have discrete color ranges but instead has a continuous curve with peaks at the display's primary colors and troughs between the peaks. The troughs between the peaks may not reach zero, so that the display can emit colors across the entire range of desired wavelengths. When 100% of the light between the pass bands is blocked, as in the example of FIG. 4, filter 34 may impart some color shifts to display light 22. Color shifts may be reduced by using a filter 34 that with a transmission spectrum that is more continuous than the discrete pass band arrangement of FIG. 4. This type of example is illustrated in FIG. 5.

Figure 5:
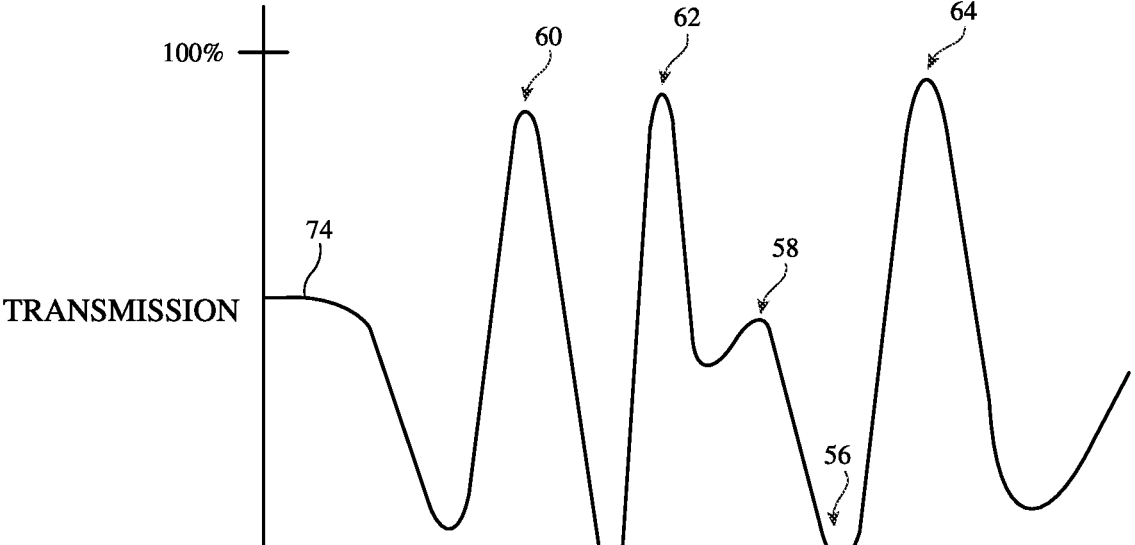

Curve 74 of FIG. 5 illustrates how much light of different wavelengths is transmitted through filter 34. In the example of FIG. 5, filter 34 has a continuous transmission spectrum such that curve 74 has peaks (e.g., peaks 60, 62, and 64) separated by troughs (e.g., trough 56) that do not reach all the way to zero. Peaks 60, 62, and 64 of curve 74 may each correspond to a given primary color of display 16. For example, peak 60 may correspond to blue light, peak 62 may correspond to green light, and peak 64 may correspond to blue light. Filter 34 may block some or most of the light that is outside of the ranges of wavelengths encompassing the primary colors of display 16. The presence of troughs such as trough 56 at non-zero values allows colors between the primary colors to pass through filter 34, which can help preserve the color of display light 22. Curve 74 may have other types of transmission spectrum features (e.g., local peaks such as local peak 58, local troughs, and/or other features) that help reduce the brightness of sunlight 24 while preserving (as much as desired) the brightness and/or color of display light 22 and/or while preserving (or minimally altering) other colors such as traffic light colors, traffic sign colors, and/or other driver safety associated colors, memory colors such as skin, sky, trees, etc., fluorescent light colors, and/or any other suitable color.

In the example of FIG. 5, light filter 34 filters out infrared light. This is merely illustrative. If desired, filter 34 may be configured to transmit infrared light so that infrared cameras in device 12 may capture infrared images of the user's eyes (e.g., in devices that use facial recognition technology to verify the identity of a user). To ensure that device 12 can still properly verify the identity of a user wearing sunglasses 14, filter 34 may be configured to transmit infrared light, as shown in the example of FIG. 6.

Figure 6:
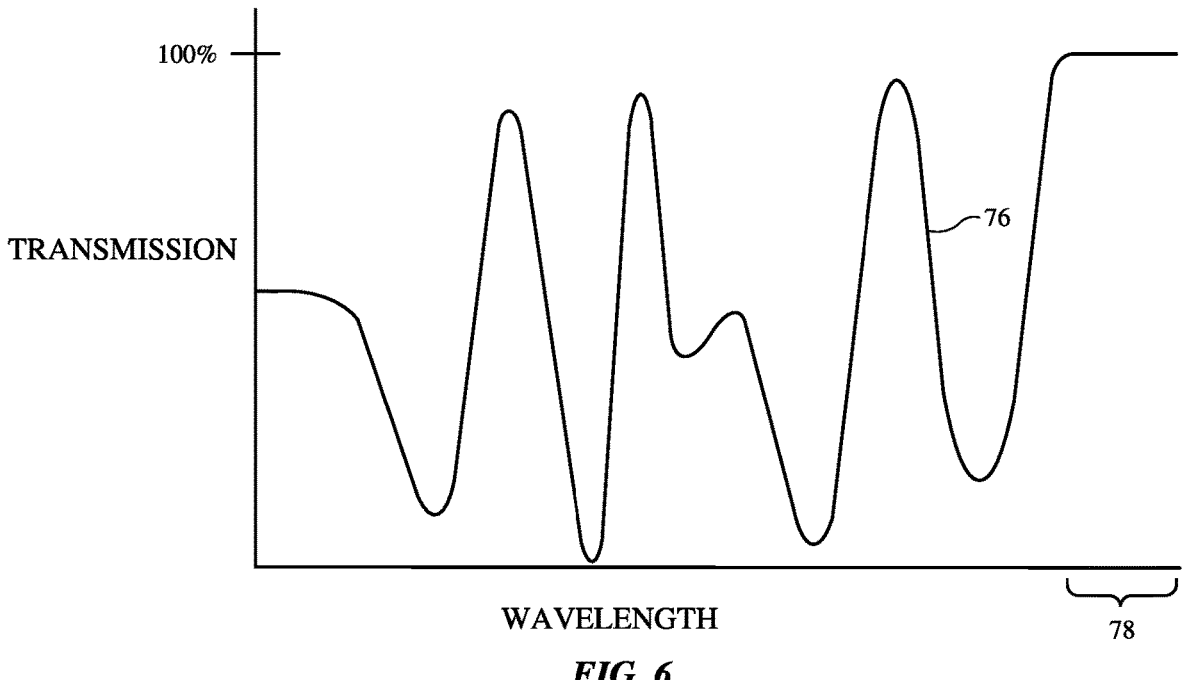

Curve 76 of FIG. 6 illustrates how much light of different wavelengths is transmitted through light filter 34. Similar to the example of FIG. 5, filter 34 has a continuous transmission spectrum with peaks separated by troughs that do not reach all the way to zero. The peaks of curve 76 may each correspond to a given primary color of display 16. The presence of troughs at non-zero values and other transmission spectrum features (e.g., local peaks, local troughs, etc.) may help reduce the brightness of sunlight 24 while preserving the brightness and/or color of display light 22. Curve 76 also transmits light in infrared wavelength range 78, so that infrared light from an infrared light source in device 12 (e.g., a facial recognition sensor in device 12 that is used to verify the identity of a user wearing sunglasses 14). This allows device 12 to verify the identity of a user wearing sunglasses 14 by emitting infrared light (e.g., structured infrared light) towards the user's face and eyes and detecting the reflected infrared light that reflects from the user's face and eyes. The infrared light may pass through lenses 20 by incorporating an infrared pass region in the transmission spectrum of filter 34.

Figure 7:
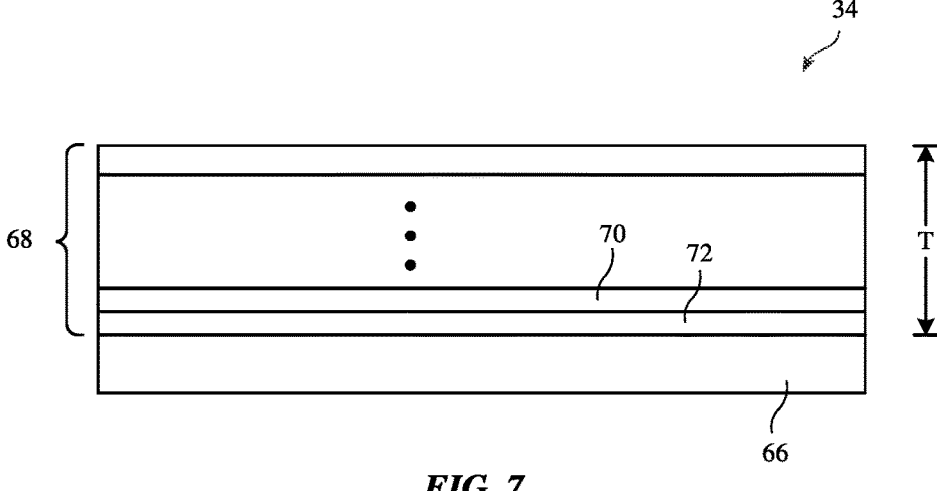
FIG. 7 is a cross-sectional side view of an illustrative filter that may be used in display-optimized lenses in accordance with an embodiment.

FIG. 7 is a cross-sectional side view of an illustrative light filter 34. In the example of FIG. 7, light filter 34 is a dichroic filter formed from a stack of thin films 68 on a substrate such as substrate 66. Substrate 66 may be polymer, glass, or other suitable material. Thin films 68 may form a thin film interference filter by stacking dielectric layers such as dielectric layers 70 and 72 with alternating higher and lower refractive index values. Dielectric layers 70 and 72 may, for example, be formed from silicon oxide and niobium pentoxide, respectively, or may be formed from any other suitable combination of dielectric thin films. The total thickness T of filter 34 may be between 2 microns and 3 microns, between 1 micron and 4 microns, between 0.5 microns and 2 microns, between 2.5 microns and 3.5 microns, between 4 and 5 microns, greater than 5 microns, less than 5 microns, or other suitable thickness.

The arrangement of FIG. 7 in which filter 34 is a reflective dichroic filter is merely illustrative. If desired, light filter 34 may be an absorptive filter.

Figure 8:
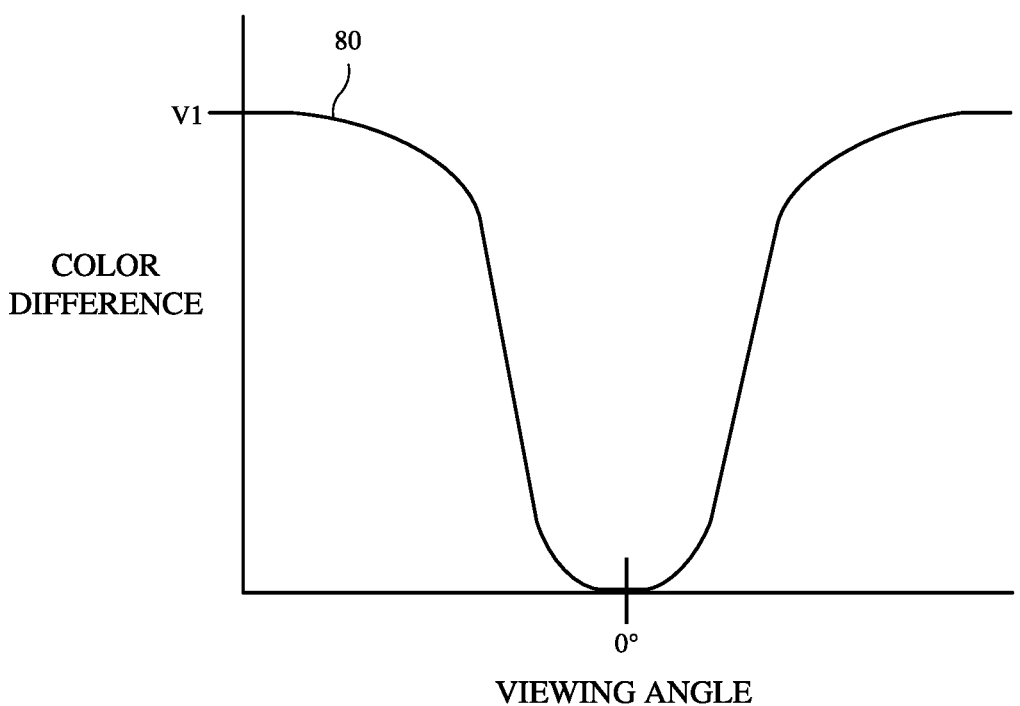
FIG. 8 is a graph showing how color difference varies with viewing angle for a filter that is optimized for a zero-degree viewing angle in accordance with an embodiment.
Figure 9:
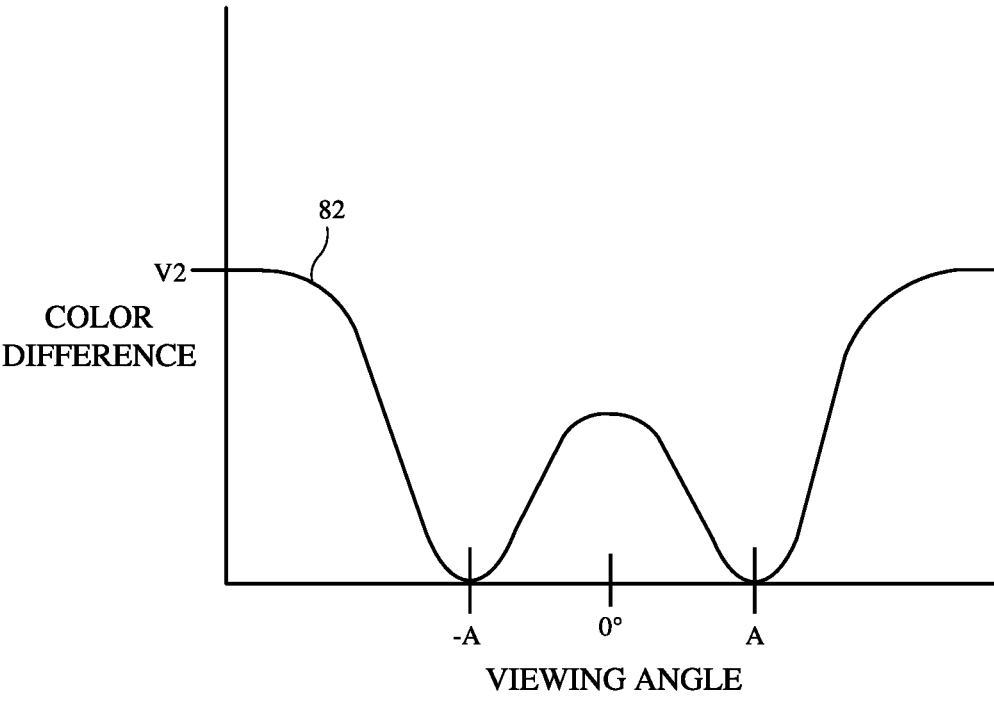
FIG. 9 is a graph showing how color difference varies with viewing angle for a filter that is optimized for a non-zero-degree viewing angle in accordance with an embodiment.

FIGS. 8 and 9 show how a light filter such as light filter 34 may be optimized for different viewing angles to achieve the desired amount of color accuracy at different viewing angles. When light filter 34 is formed from a dichroic filter of the type shown in FIG. 7, the filter may impart a color shift to light that is transmitted through the filter. The amount of color shift may depend on the viewing angle that the dichroic filter is optimized for.

The amount of color shift imparted by a given filter may be determined by calculating the color difference (sometimes referred to as delta E or $\Delta E$) between a color observed without the filter and the color observed with the filter. Color difference may be determined in any suitable color space (e.g., CIE La*b* color space, XYZ color space, RGB color space, etc.).

FIG. 8 illustrates how colors are shifted at different viewing angles when filter 34 is optimized for a zero-degree viewing angle. As shown in FIG. 8, dichroic filters that are optimized for a zero-degree viewing angle exhibit no color difference (color shifts) at a viewing angle of zero-degrees, but exhibit a sharp increase in color difference for viewing angles just outside of the zero-degree viewing angle. The maximum color shift may reach value V1 at wide viewing angles.

If it is desired to preserve colors for a wider range of viewing angles, light filter 34 may be optimized for a non-zero-degree viewing angle, as shown in the example of FIG. 9.

FIG. 9 illustrates how colors are shifted at different viewing angles when filter 34 is optimized for viewing angle A. Angle A may be a non-zero value such as 15 degrees, 20 degrees, 25 degrees, 10 degrees, greater than 10 degrees, less than 10 degrees, or other suitable angle. As shown in FIG. 9, dichroic filters that are optimized for a viewing angle with a non-zero value exhibit a moderate color shift at a viewing angle of zero-degrees and no color shift at angle A. The maximum color shift (sometimes referred to as color difference) may reach value V2 at wide viewing angles, which may be less than value V1. The moderate amount of color shifting at zero-degrees in FIG. 9 may be less noticeable to the user than the sharp increase in color shifting that occurs when filter 34 is optimized for a zero-degree viewing angle. This is merely illustrative, however. In general, light filter 34 may be optimized for any suitable viewing angle.

Figure 10:
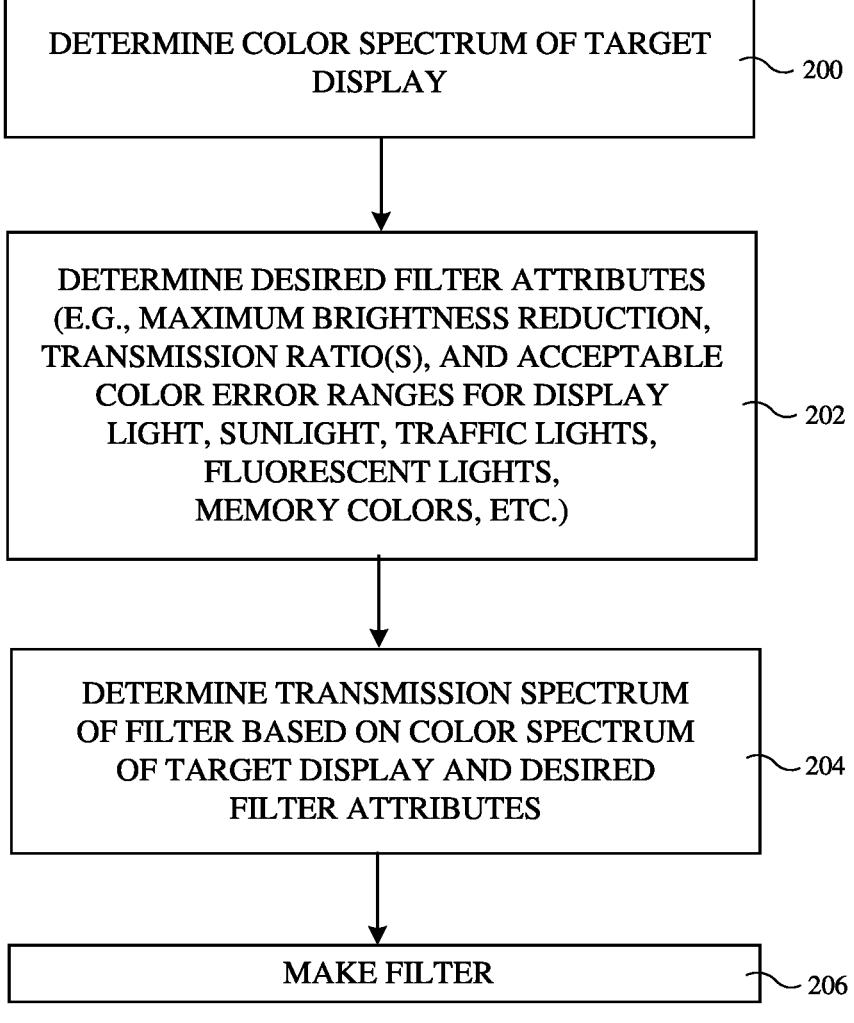
FIG. 10 is a flow chart of illustrative steps in producing a filter for a display-optimized lens in accordance with an embodiment.

FIG. 10 is a flow chart of illustrative steps involved in forming a display-optimized color filter such as light filter 34 for sunglasses 14.

During the operations of block 200, the color spectrum of the target display may be obtained. This may include, for example, obtaining the display specifications of a given cellular telephone display, a laptop display, a tablet computer display, a wrist watch display, television display, and/or any other suitable display. The color spectrum may be measured or may be a known (predetermined) color spectrum.

During the operations of block 202, the desired filter attributes of light filter 34 may be determined. This may include, for example, determining what the maximum brightness reduction of sunlight 24 should be, what the maximum brightness reduction of display light 22 should be, what the desired brightness ratio of sunlight to display light should be, what the acceptable color error ranges should be for display light 22, sunlight 24, traffic lights and other driver safety colors, fluorescent lights, memory colors (e.g., skin colors, sky colors, tree colors, etc.), and/or other desired characteristics of light filter 34.

The operations of block 202 may also include determining how to weight the various desired aspects of filter 34. For example, there may be tradeoffs when trying to reduce the brightness of sunlight 24 while preserving the brightness and color of display light 22. Different weights may be applied to the desired filter attributes depending on the level of importance of each filter attribute. In particular, a formula may be used to obtain the desired filter characteristics. The formula may include multiple terms, each term corresponding to a different filter attribute. For example, some terms may maximize transmission of certain colors and other terms may minimize transmission of other colors. Different weights may be applied to the different formula terms depending on the level of importance of each term. For example, reducing sunlight brightness may be more important than preserving colors of fluorescent lights, so the term that corresponds reducing sunlight brightness may be weighted more heavily than the term that preserves the colors of fluorescent lights, if desired.

In the operations of block 204, the transmission spectrum of light filter 34 may be determined based on the color spectrum of the target display and the other desired filter attributes determined during the operations of block 202. If desired, numerical optimization techniques may be employed to determine the transmission spectrum that best fits the desired filter characteristics. For example, computing equipment may make an initial guess of the transmission spectrum followed by an iterative process to refine the transmission spectrum to the best final result that satisfies a figure of merit (e.g., minimization techniques, making a derivative equal to zero by comparing and filtering intermediate results, etc.). In general, any suitable numerical methods may be used to obtain the transmission spectrum of filter 34 based on the color spectrum of the target display and other desired filter attributes.

In the operations of block 206, a filter having the transmission spectrum determined during the operations of step 204 may be produced. This may include, for example, forming thin-film interference layers on a substrate to form a dichroic filter and/or forming other suitable filter layers to produce filter 34 with the display-optimized transmission spectrum.

The foregoing is merely illustrative and various modifications can be made to the described embodiments. The foregoing embodiments may be implemented individually or in any combination.

What is claimed is:

1. A head-mounted device configured to be controlled by a handheld electronic device having a touch-sensitive display that emits display light, the head-mounted device comprising:
   a head-mounted support structure;
   a transparent display supported by the head-mounted support structure, wherein the transparent display comprises a waveguide and is configured to display content provided by the handheld electronic device; and
   a lens through which a user views the touch-sensitive display, wherein the lens reduces a brightness of ambient light by a first amount and reduces a brightness of the display light from the touch-sensitive display by a second amount that is less than the first amount, wherein the display light is viewable through the lens and the transparent display, and wherein the transparent display comprises a quarter wave plate, the lens comprises a half wave plate, and light from the transparent display passes back and forth through the quarter wave plate.

2. The head-mounted device defined in claim 1 wherein the lens comprises a color filter having a transmission spectrum curve with peaks corresponding to primary colors of the display.

3. The head-mounted device defined in claim 1 wherein the transparent display comprises an optical combiner.

4. The head-mounted device defined in claim 1 wherein the lens is configured to transmit infrared light emitted by a facial recognition sensor in the handheld electronic device.

5. A head-mounted device, comprising:
   a frame;
   a transparent display mounted to the frame and configured to display first display content, wherein the transparent display comprises a waveguide; and
   a lens mounted to the frame and configured to transmit polarized display light from an external display that is displaying second display content, wherein the second display content is viewable through the transparent display and wherein the lens comprises:
      a polarizer that transmits the polarized display light; and
      a color filter that reduces a brightness of ambient light, wherein the color filter has a transmission spectrum curve with peaks that correspond to first, second, and third primary colors of the external display, and wherein the transparent display comprises a quarter wave plate, the lens comprises a half wave plate, and light from the transparent display passes back and forth through the quarter wave plate.

6. The head-mounted device defined in claim 5 wherein the color filter comprises an electrochromic filter and the lens is a removable clip-on lens.

7. The head-mounted device defined in claim 5 wherein the first display content is adjusted in response to user input on the external display.

8. The head-mounted device defined in claim 5 wherein a brightness of the polarized display light that passes through the lens is greater than the brightness of ambient light that passes through the lens.

9. A head-mounted device, comprising:
   a head-mounted support structure;
   a head-mounted display supported by the head-mounted support structure, wherein the head-mounted display comprises a waveguide; and
   a lens overlapping the head-mounted display, wherein display light emitted by an external display is viewable through the lens and the head-mounted display, wherein the lens reduces a brightness of sunlight by a first amount and reduces a brightness of the display light by a second amount that is less than the first amount, wherein the lens comprises a light filter having a transmission spectrum curve with first, second, and third peaks corresponding respectively to first, second, and third primary colors of the external display, and wherein the head-mounted display comprises a quarter wave plate, the lens comprises a half wave plate, and light from the head-mounted display passes back and forth through the quarter wave plate.

10. The head-mounted device defined in claim 9 wherein the head-mounted display is transparent and the lens is a removable clip-on lens.

11. The head-mounted device defined in claim 9 wherein the display light is polarized display light and wherein the lens comprises:
      a polarizer that transmits the polarized display light.

12. The head-mounted device defined in claim 9 wherein the transmission spectrum curve has a fourth passband that transmits infrared light and wherein the first, second, and third peaks are separated by troughs that have non-zero values.

13. The head-mounted device defined in claim 9 wherein the display light emitted by the external display is circularly polarized and wherein the lens comprises a circular polarizer that transmits the circularly polarized display light.

14. The head-mounted device defined in claim 13 wherein the circular polarizer comprises a linear polarizer and a quarter wave plate.

15. The head-mounted device defined in claim 9 wherein the head-mounted display is configured to display content that is adjusted in response to user input to the external display.

16. The head-mounted device defined in claim 9 wherein the lens comprises an electrochromic filter.

\* \* \* \* \*